United States Patent Office 3,220,783
Patented Nov. 30, 1965

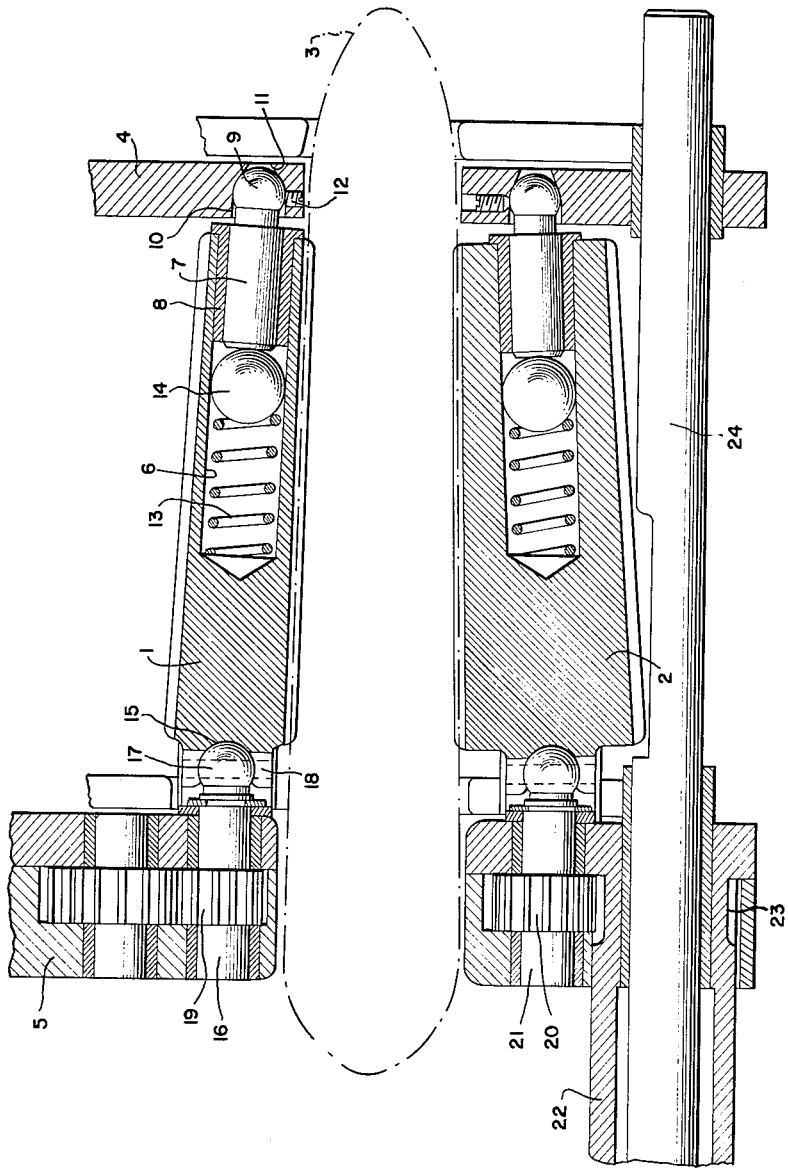

3,220,783
BEARING ARRANGEMENT FOR ROTATING BUNCH ROLLERS IN CIGAR WRAPPING MECHANISMS
Valter A. Ahlbor, Bromma, and Arne Carlson, Norrviken, Sweden, assignors to Arenco Aktiebolag, Vallingby, Sweden, a Swedish joint-stock company
Filed Jan. 23, 1963, Ser. No. 253,362
Claims priority, application Sweden, Jan. 26, 1962, 850/62
10 Claims. (Cl. 308—15)

The present invention relates to bearing arrangements for rotating bunch rollers in cigar wrapping mechanisms. The purpose of the invention is to effect particularly reliable mounting which moreover requires little space and which enables the rollers to be mounted and dismounted in a simple manner.

According to the invention this has been achieved by journalling a non-driven end of such a roller on a shaft rotatably and displaceably mounted in an axially directed recess in the end of the roller, which shaft is embodied with an axially projecting, ball-shaped part fixed in a mainly cylindrical recess arranged in a stand part. The ball-shaped part of the shaft and the mainly cylindrical recess in the stand form, together with suitable fixing members for the ball-shaped part, e.g. lock rings or stop screws, a ball and socket joint by means of which the shaft is fixed in an inclined position relative to the stand, determined by the inclination of the roller in its mounted position, while the bearing of the roller on the shaft is arranged in the recess in the roller, this enabling the bearing to be formed in an advantageous manner with regard to wear and tear. The arrangement can be so executed that the ball-shaped part of the shaft is inserted into the recess in the stand either from the side of the stand where the roller is situated or from the opposite side, in which case the recess must penetrate right through the stand and be so executed that the shaft can be moved through it. According to a particularly suitable embodiment, the recess is formed with a conical or spherical portion against which the ball-shaped part is stopped when inserted, after which fastening is effected with a lock ring or stop screw screwed in radially to the ball-shaped part so that it is pressed against the conical or spherical portion of the recess.

The invention is illustrated in the attached drawing by an embodiment chosen as an example. The drawing shows a cigar wrapping mechanism provided with four rollers in a section through an upper and a lower roller 1 and 2, a cigar bunch 3 being indicated between the rollers. The ends of each roller 1, 2 are mounted in a stand 4, 5. The non-driven end of a roller is provided with an axial recess 6 in which a shaft 7 is rotatably and displaceably mounted in a bushing 8 fixed at the end of the roller. The shaft 7 is executed with a ball-shaped end part 9 which is in a cylindrical recess 10 in the stand part 4, this recess passing into a conical recess 11 penetrating completely through the stand part 4. The ball-shaped part 9 is kept fixed in the recess by a stop screw 12. In the recess 6 of the roller a pressure spring is arranged to press a ball 14 against the inner end of the shaft 7.

The opposite end of the roller is provided with a mainly semi-spherical recess 15 into which fits the ball-shaped end part 17 of a shaft 16 rotatably mounted in the stand part 5. This part 17 is provided with a diametrically placed follower pin 18 coacting with two slots in the material around the recess 15 open towards the end of the roller. A gear 19 is fixed on the shaft 16 and is driven, via an intermediate gear, by a gear 20 on the corresponding mounting shaft 21 of the lower roller, this gear 20 being driven from a rotatably mounted sleeve 22, the end of which is provided with a gear ring 23 cooperating with the gear 20.

Both the other rollers not shown are formed and mounted in a corresponding manner and driven by a sleeve corresponding to the sleeve 22. Both pairs of rollers can be swung laterally outwards and are arranged around their fixed shafts 24 on which the stand parts 4, 5 are mounted. On mounting a roller in the mechanism, the roller is inserted with the recess 15 against the ball-shaped part 17, the pin 18 being fitted into the corresponding slots in the end of the roller. The shaft 7 is pressed a little way into the recess 6 against the action of the spring 13, after which the end of the roller is swung in towards the recess 10 into which the ball-shaped part 9 is pressed by the spring 13. The shaft 7 is herewith kept at the correct inclination by the bushing 8 and the shaft can be securely fastened in the right position with the stop screw 12. The roller thereafter is kept pressed against the ball-shaped part 17 of the shaft 16 by the spring 13 through the agency of the ball 14 which conveys the pressure axially from the end of the fixed shaft 7 to the pressure spring 13 rotating with the roller. Because the roller is kept pressed against the ball-shaped part 17 no further control of the roller in an axial direction is required despite the displaceable mounting of the shaft 17 in the bushing 8, wherefore for this reason, too, the formation of the mounting of the rollers shown constitutes a particularly suitable embodiment of the invention.

On dismounting a roller the shaft 7 is pressed into the recess 6 by pressing a tool against the end of the ball-shaped part 9 from the exterior of the stand part 4, after which the roller can be swung out and removed.

The part 9 is suitably executed with a smaller diameter than the shaft 7, so that the part 9 can be pressed into the bushing 8, enabling the stand part 4 to be arranged close to the end of the roller, the mounting thereby requiring little space.

What is claimed is:

1. A bearing arrangement for rotatably mounted rollers having detachable journals at both ends, comprising a roller having an axial bore at one end, a spring in said bore, a shaft projecting into said bore against the action of said spring, said end of said roller being rotatably and slidingly journalled on said shaft, said shaft having an axially projecting, ball-shaped part fixedly mounted in a principally cylindrical recess in a stand by mounting means preventing rotation of said ball-shaped part of said shaft, said mounting means acting upon said ball-shaped part in a principally radial direction.

2. A bearing arrangement as claimed in claim 1, wherein said shaft is inwardly displaceable in said bore against the action of said spring arranged in the bore and said recess in said stand is provided with a curved part against which said ball-shaped part of the shaft is pressed by said spring.

3. A bearing arrangement as claimed in claim 2, wherein said ball-shaped part of said shaft is fixed in said recess by a stop screw directed principally radially towards said ball-shaped part.

4. A bearing arrangement as claimed in claim 2, wherein said recess in the stand penetrates through the stand.

5. A bearing arrangement as claimed in claim 2, wherein said ball-shaped part of the shaft is formed with a smaller diameter than said shaft.

6. A bearing arrangement as claimed in claim 3, wherein said recess in the stand penetrates through the stand.

7. A bearing arrangement as claimed in claim 3, wherein said ball-shaped part of the shaft is formed with a smaller diameter than said shaft.

8. A bearing arrangement as claimed in claim 4, wherein said ball-shaped part of the shaft is formed with a smaller diameter than said shaft.

9. A bearing arrangement as claimed in claim 6, wherein said ball-shaped part of the shaft is formed with a smaller diameter than said shaft.

10. A bearing arrangement as claimed in claim 1, wherein the opposite end of the roller is provided with an axially directed principally semi-spherical recess, into which fits a ball-shaped end part of a shaft rotatably mounted in the stand, the end part being provided with a follower pin which cooperate with slots on the roller open towards the end of the roller.

References Cited by the Examiner

UNITED STATES PATENTS

| | | | |
|---|---|---|---|
| 1,041,900 | 10/1912 | Tatum | 308—215 |
| 1,105,951 | 8/1914 | Bagnall | 242—55.2 |
| 1,362,910 | 12/1920 | Zoeller | 308—20 X |
| 1,425,561 | 8/1922 | Wego | 308—20 |
| 1,589,739 | 6/1926 | Bixby. | |
| 1,802,708 | 4/1931 | Dina | 308—20 X |
| 1,889,174 | 11/1932 | Drexler | 308—20 |
| 2,046,550 | 7/1936 | Daniels | 308—20 X |
| 2,141,810 | 12/1938 | Carroll | 308—20 |

FOREIGN PATENTS

| | | |
|---|---|---|
| 39,876 | 11/1909 | Austria. |
| 71,680 | 2/1916 | Switzerland. |

DON A. WAITE, *Primary Examiner.*

FRANK SUSKO, ROBERT C. RIORDON, *Examiners.*